(12) United States Patent
Zunhammer (10) Patent No.: US 9,241,439 B2
(45) Date of Patent: Jan. 26, 2016

(54) METHOD AND VEHICLE FOR DISTRIBUTING MANURE

(76) Inventor: Sebastian Zunhammer, Traunreut (DE)

( * ) Notice: Subject to any disclaimer, the term of this patent is extended or adjusted under 35 U.S.C. 154(b) by 1303 days.

(21) Appl. No.: 12/445,353

(22) PCT Filed: Oct. 8, 2007

(86) PCT No.: PCT/EP2007/008698
§ 371 (c)(1),
(2), (4) Date: Mar. 19, 2010

(87) PCT Pub. No.: WO2008/043502
PCT Pub. Date: Apr. 17, 2008

(65) Prior Publication Data
US 2011/0130927 A1    Jun. 2, 2011

(30) Foreign Application Priority Data
Oct. 11, 2006  (DE) .......................... 20 2006 015 589

(51) Int. Cl.
*G06F 7/70*  (2006.01)
*A01C 23/00*  (2006.01)

(52) U.S. Cl.
CPC ............. *A01C 23/007* (2013.01); *A01C 23/001* (2013.01)

(58) Field of Classification Search
CPC ..... E02F 9/2025; E02F 9/2246; E02F 9/2296; E02F 9/123; G06F 17/00; G06F 19/00; A01B 79/005
USPC .......................................................... 701/50
See application file for complete search history.

(56) References Cited

U.S. PATENT DOCUMENTS

| | | | | |
|---|---|---|---|---|
| 2,792,255 A | * | 5/1957 | Bellows | 239/172 |
| 2,941,753 A | * | 6/1960 | Ripper | 244/190 |
| 2,956,713 A | * | 10/1960 | Kerley, Jr. | 222/464.3 |
| 5,801,948 A | * | 9/1998 | Wood et al. | 700/108 |
| 6,122,581 A | * | 9/2000 | McQuinn | 701/50 |
| 6,230,091 B1 | * | 5/2001 | McQuinn | 701/50 |
| 6,611,755 B1 | * | 8/2003 | Coffee et al. | 701/482 |
| 6,753,966 B2 | * | 6/2004 | Von Rosenberg | 356/432 |
| 6,836,325 B2 | * | 12/2004 | Maczura et al. | 356/328 |
| 6,887,382 B2 | * | 5/2005 | Moutray | C05F 7/00 210/602 |
| 2001/0055116 A1 | * | 12/2001 | Maczura et al. | 356/326 |
| 2005/0279713 A1 | * | 12/2005 | Osborn et al. | 210/760 |
| 2007/0175825 A1 | * | 8/2007 | Denney | 210/631 |
| 2007/0272004 A1 | | 11/2007 | Rode et al. | |

FOREIGN PATENT DOCUMENTS

DE  19520950 C1  5/1996
DE  10142865 A1  3/2003
(Continued)

OTHER PUBLICATIONS

International Search Report, PCT/EP2007/008698, dated Jan. 16, 2008.

*Primary Examiner* — Behrang Badii
*Assistant Examiner* — Daniel L Greene
(74) *Attorney, Agent, or Firm* — Lerner, David, Littenberg, Krumholz & Mentlik, LLP (57) ABSTRACT

The invention relates to a method and a vehicle for distributing manure, whereby a slurry sensor (8) determines the contents of the slurry (G) to be distributed, and an evaluation device (10) compares the determined values with pre-defined contents data. The quantity of slurry (G) to be distributed per unit of surface area is then computed depending on this comparison result. An adjustable valve (6) controls a distributor device (7) by means of which the computed quantity of slurry (G) is distributed on the land in accordance with the comparison result.

18 Claims, 7 Drawing Sheets

(56) References Cited

FOREIGN PATENT DOCUMENTS

| DE | 10318942 | A1 | | 11/2004 |
|---|---|---|---|---|
| DE | 102004010217 | A1 | | 9/2005 |
| EP | 430347 | A | * | 6/1991 |
| EP | 0846408 | A1 | | 6/1998 |
| WO | 0064242 | A1 | | 11/2000 |

* cited by examiner

METHOD AND VEHICLE FOR DISTRIBUTING MANURE

CROSS REFERENCE TO RELATED APPLICATIONS

The present application is a national phase entry under 35 U.S.C. §371 of International Application No. PCT/EP2007/008698, filed Oct. 8, 2007, published in German, which claims the benefit of German Patent Application No. 20 2006 015 589.9, filed Oct. 11, 2006. The disclosures of said applications are incorporated by reference herein.

This invention relates to a vehicle for distributing manure of the type outlined in the introductory part of claims 1 to 3.

Vehicles for distributing slurry-based manure have long been known. For example, patent specification DE 195 20 950 C1 discloses a manure-distributing vehicle, whereby liquid manure is distributed via a hose-distributor system close to the ground. Specific mention is already made of the fact that efforts are being made in agricultural technology to distribute manure in an environmentally friendly way. With this objective in mind, numerous solutions have been proposed but these will not be discussed in detail here because these proposals are based on solutions covering very different aspects.

The so-called "Düngeverordnung" (regulations governing manure) contains rules, for example, about what concentration of substances may be contained in the respective manure distributed in fields. For example, it is stipulated how many kilograms (kg) of nitrogen (N) may be distributed on the ground per hectare (ha) and per year. Nitrogen will be referred to as but one example below, and it is important to note that nitrogen itself is very rarely present in manure in its pure form but usually occurs in different chemical compounds, such as an ammonium-nitrogen composition, for example. Also specified are the threshold values for other substances. In order to be able to come even close to complying with these regulations, the user must be in a position to ascertain the relevant individual substances contained in the manure. If the user knows the proportions of different substances, he can influence the concentration of nutrients or substances to a greater or lesser degree by controlling the quantity applied per unit of surface area.

However, in order to be able to quantify the substances, it is better to analyze the manure in question rather than work with estimates based on ball-park figures. A condition for obtaining meaningful results is obtaining a representative sample mixture for testing. To this end, the contents of the slurry container must be homogenized, for example mixed. The fact that slurry is a manure containing a number of nutrients means that the quantity applied has to be adapted to the particular nutrient which is primarily required.

This knowledge enables the application of manure to be optimized, at least on a theoretical basis. In practice, however, a considerable number of problems have to be taken into account due to various interference factors, not all of which can be dealt with using conventional technology. For example, the user has to work with very different types of manure depending on the animal (pig manure, cattle manure, poultry manure) to name but the general differences. Operators who collect and distribute manure from different agricultural enterprises can not expect to undertake a particularly correct analysis of the manure in practice. In addition, there are also communal tanks and when these are filled, the manure can not be expected to be homogeneous with a view to testing. The contents of slurry from biogas plants are likewise undefined as a rule. Within a slurry container, there are settlement layers of varying densities and so-called floating blankets. Allowance also has to be made for the fact that in a full slurry container (slurry silo), the proportion of dry substances at the start of emptying is different from that at the end of emptying. As a result, the actual quantity of substances which is actually distributed on the ground is only roughly estimated or even unknown, although the distribution takes place with a variance of 5-10% per cbm.

To address this problem, patent specification DE 101 42 865 A1 describes a method whereby functional units (e.g. sensors) are distributed in the ground covering a large surface area of the useful surface to determine the ground values (column 4, lines 40 to 42), and devices are also distributed on the ground over a large surface area of the useful surface to apply a spray or irrigation via hoses (column 6, lines 42 to 46). A large amount of investment is needed for stationary systems of this type in order to equip a large useful surface with a plurality of sensors and provide a correspondingly high number of distributor pipes with ejector elements (hoses and nozzles) to provide a distribution over a large surface area. If the useful surface is crossed by roads, it is not practically feasible to install hoses. The data transmission modules mentioned in this publication are also very expensive to procure and operate and it is also necessary to incorporate costly redundancy measures to ensure that the measurement and control data can be transmitted without error. Finally, the result of the slurry analysis is very much dependent on the nature of the sample taken, given that it is of considerable importance whether the sample being processed is a pig manure, cattle manure or a mixed manure. Allowance also has to be made for how the manure is stored in the silo (floating blanket or deposits of solid particles on the base of the silo). With the prior art methods, slurry must be prepared taking account of these factors and the manure to be distributed must be prepared and adapted accordingly, e.g. by adding water, i.e. by mixing with fresh water (column 6, lines 34 et seq.). Another aspect of the specified teaching is that the manure prepared in this manner must be subjected to further testing by other sensors (column 5, lines 36 to 40). The distribution is then improved by known spray systems or hose-based irrigation systems. It is quite clear from the description that the apparatus and logistics as well as the use of complex and technically demanding data processing and data transmission technology are extremely expensive, quite apart from the fact that it is necessary to set up and run a testing laboratory.

Document WO 00/64242 A1 discloses a sensor for testing fluids based on a spectral analysis. In this instance, a sensor of this type is used to test milk, for example.

The underlying objective of this invention is to propose a vehicle for distributing manure, by means of which the requirements laid down by legislators can be better taken into account. The manure-distributing vehicle should enable the slurry to be tested in a simple and efficient manner and optimize the distribution of slurry-based manure.

This objective is achieved on the basis of a vehicle for distributing manure incorporating the characterizing features defined in claim 1, 2 or 3. The characterizing features of the dependent claims advantageously represent further improvements to a manure-distributing vehicle as proposed by the invention.

Of particular advantage is a method of optimizing the quantity of slurry to be distributed on the ground to be fertilized with the aid of the manure-distributing vehicle proposed by the invention, implemented on the basis of the following steps:

the slurry to be applied is analyzed by means of a sensor close to the time of distribution in order to determine its contents;

the analytically determined contents actual data is compared with a predetermined contents data set in an evaluation device;

control data is generated by the evaluation device as a function of this data comparison of the contents data;

the control data is forwarded to an adjustable valve by means of which the quantity of slurry can be varied;

the distributor device is activated by a valve on the basis of the control data so that the quantity of slurry to be applied per unit of surface area is regulated in accordance with the control data.

In order to implement this method, the use of a manure-distributing vehicle with a supply container and a distributor device connected to the supply container is recommended, and the manure-distributing vehicle has at least one sensor for measuring the contents as well as an evaluation device generating control data which is computed by comparing the slurry contents actual data measured by the sensor with predefinable contents data, and a variable quantity of slurry can be distributed on the ground per unit of surface area by means of the distributor device as a function of the control data generated by the evaluation device.

In this respect, a slurry vehicle is of particular advantage if the sensor is disposed in the filling region of the supply container.

In another particularly advantageous embodiment of a manure-distributing vehicle, the sensor is disposed in the pipe system between the filling region and the distributor device.

In yet another advantageous embodiment of manure-distributing vehicles, a sensor is disposed in the supply container.

It may also be of advantage to use an embodiment in which the sensor for measuring the contents is disposed between the supply container and distributor device whilst the flowing manure (G) is being applied, namely in a portion of a pipe system disposed between the supply container and the distributor device.

A manure-distributing vehicle also advantageously has a pipe system incorporating a pump, the speed of which is regulated.

It is also of advantage to use a manure-distributing vehicle in which the adjustable device is provided in the form of a three-way valve co-operating with the pipe system.

A manure-distributing vehicle offers particular advantages if the distributor device is provided in the form of a trailing hose distributor or a manure injector.

A manure-distributing vehicle also offers advantages if it is designed as a self-propelled vehicle. However, manure-distributing vehicles designed as trailers also offer advantages.

A manure-distributing vehicle is of particular advantage if the sensor is provided in the form of an optical sensor which operates on the basis of a spectral analysis and the sensor is connected to the evaluation device by means of an optical data cable.

The invention will be described in more detail below with reference to examples of embodiments illustrated in the appended drawings.

Of these

Figure 1:
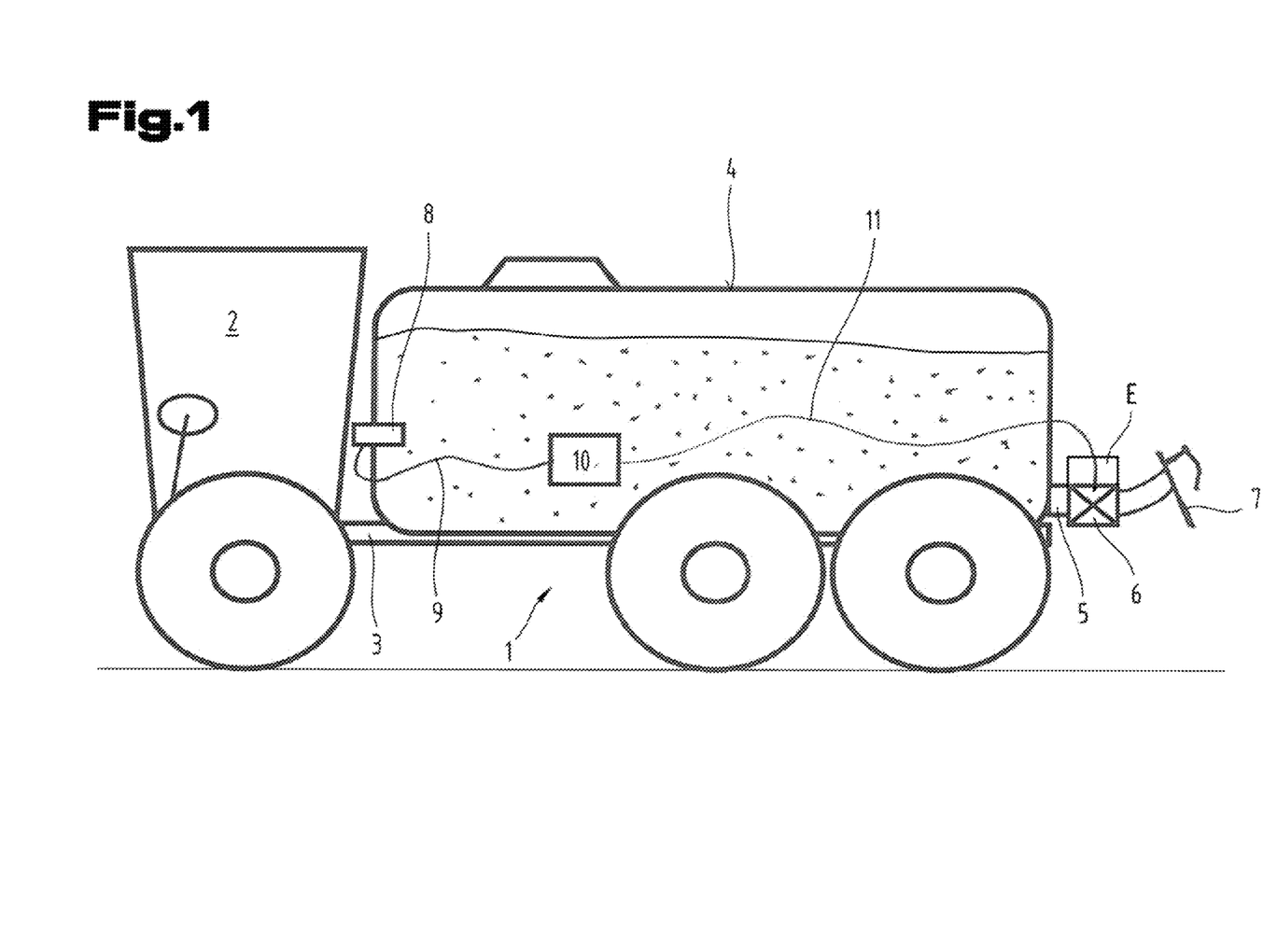
FIG. 1 illustrates a self-propelled manure-distributing vehicle.

FIG. 1 is a highly schematic diagram showing a side view of a manure-distributing vehicle. Reference number 1 denotes the manure-distributing vehicle as a whole, which comprises a driver's cab 2 and a chassis 3. A supply container 4 accommodates the supply of slurry G to be distributed. Although not illustrated, a pump conveys the slurry G to be distributed with the aid of a pipe system 5 via a valve 6 to a distributor device 7, by means of which the slurry G is distributed.

The distributor device 7 may be of any type. A hose trailing device—although this is not illustrated—may be of advantage. The distributor device, not illustrated, may be provided with trailing hoses which terminate close to the ground, thereby optimizing the distribution of the slurry G. Advantages may be gained by using other slurry distributors, such as slurry grubbers, sliding foot distributors or other types.

The valve 6 is disposed at an appropriate point in the pipe system 5 and may be a multi-way valve. A sensor 8 is disposed in the supply container 4 of the manure-distributing vehicle 1. The sensor 8 may be based on any design and must be capable of analyzing the slurry G at a time close to distribution to determine its contents. A preferred design is an optical sensor 8, which subjects the slurry G to a spectral analysis. The measurement data obtained by the sensor 8 is forwarded via data cables 9 to an evaluation device 10 which activates the pump and the valve 6 via other data cables 11 depending on the result of the analysis conducted by the slurry sensor 8 so that the quantity of slurry—by reference to its contents—distributed on the ground by the distributor device 7 corresponds to the predefined contents per unit of surface area as accurately as possible.

It is clear that in this manner, the proportions of contents measured by the sensor 8 close to the time of distribution will determine the quantity of slurry distributed. To this end, the measurement data in the evaluation device 10 is converted into control signals for the pump and/or the valve 6 and the quantity distributed is controlled on the basis of the desired variables. The desired variables may be the variables specified by legislators or alternatively desired data derived from the nutrient requirement of the ground generally or the nutrient requirement of plants.

Figure 2:
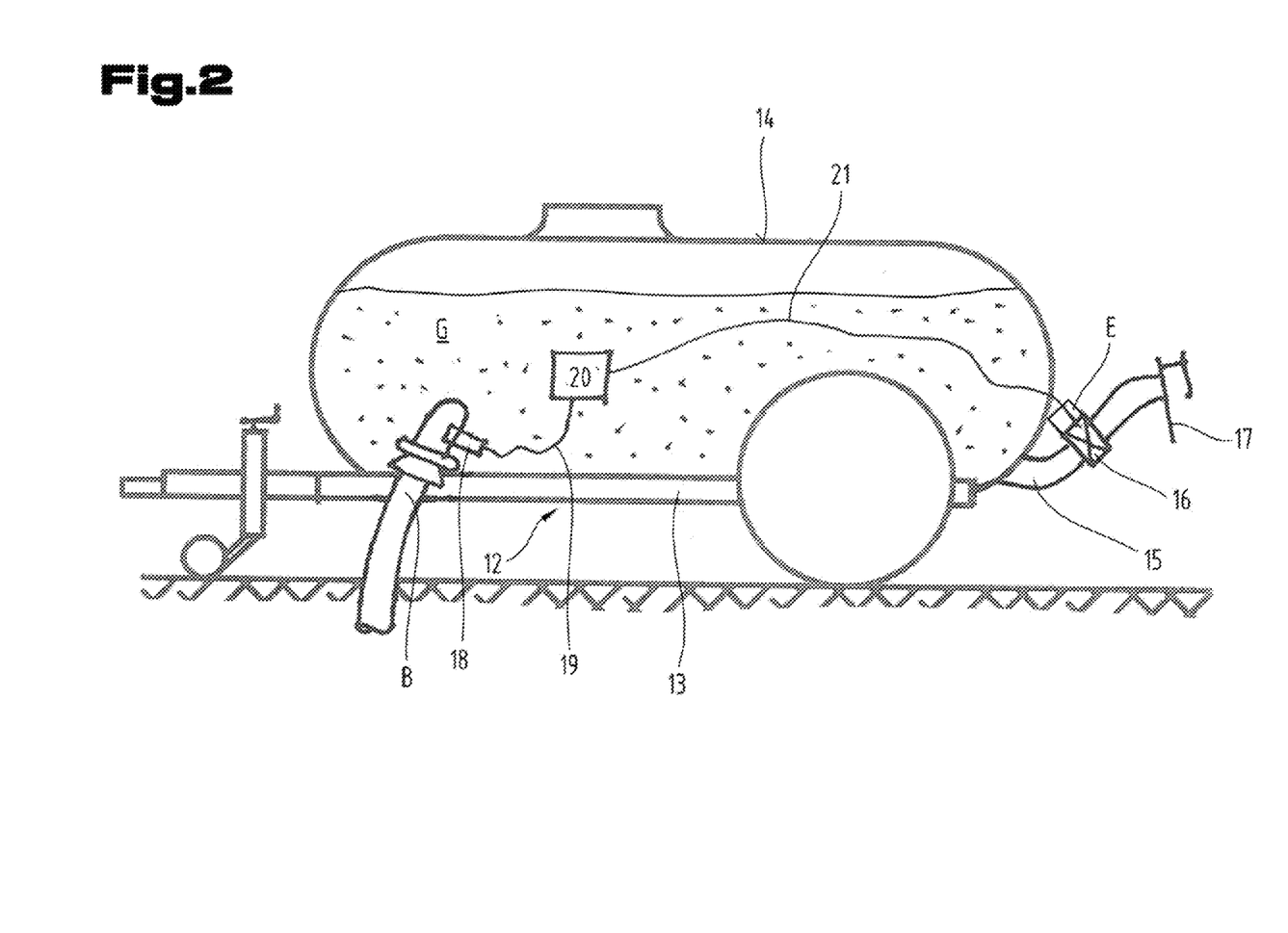
FIG. 2 illustrates a manure-distributing vehicle designed as a trailer.

FIG. 2 provides a schematic illustration similar to that of FIG. 1 showing a manure-distributing vehicle based on a slurry trailer 12. Similarly to the self-propelled vehicle 1 illustrated in FIG. 1, the vehicle trailer 12 has a chassis 13. A supply container 14 accommodates the supply of slurry G to be distributed. Although not illustrated, a pump conveys the slurry G to be distributed with the aid of a pipe system 15 via a valve 16 to a distributor device 17, by means of which the slurry G is distributed. Again in this example of an embodiment, the distributor device 17 may also be of any type. The valve 16 is disposed at an appropriate point in the pipe system 15 and may be provided as a slide valve. A sensor 18 is disposed in the filling region B of the supply container 14 of the manure-distributing vehicle 12. Again in this embodiment, the sensor 18 may be of any design and must be capable of analyzing the slurry G close to the time of distribution to determine its contents. A preferred design is that of an optical sensor 18, which subjects the slurry G to a spectral analysis.

The measurement data obtained by the sensor 18 is forwarded via data cables 19 to an evaluation device 20, which activates the pump and valve 16 via other data cables 21 depending on the result of the analysis conducted by the slurry sensor 18 so that the quantity of slurry—by reference to its contents—distributed on the ground by the distributor device 17 corresponds to the predefined contents per unit of surface area as accurately as possible.

In this embodiment in which the sensor is disposed in the filling region B of the supply container 14, the slurry is analyzed whilst the supply container 14 is being filled. This might be during filling from a stationary container on the agricultural site or alternatively in the field if filling takes place on the basis of a transfer from a larger delivery vehicle to a smaller distributor vehicle. In both cases, the analysis takes place during filling and close to the time of subsequent distribution.

Figure 3:
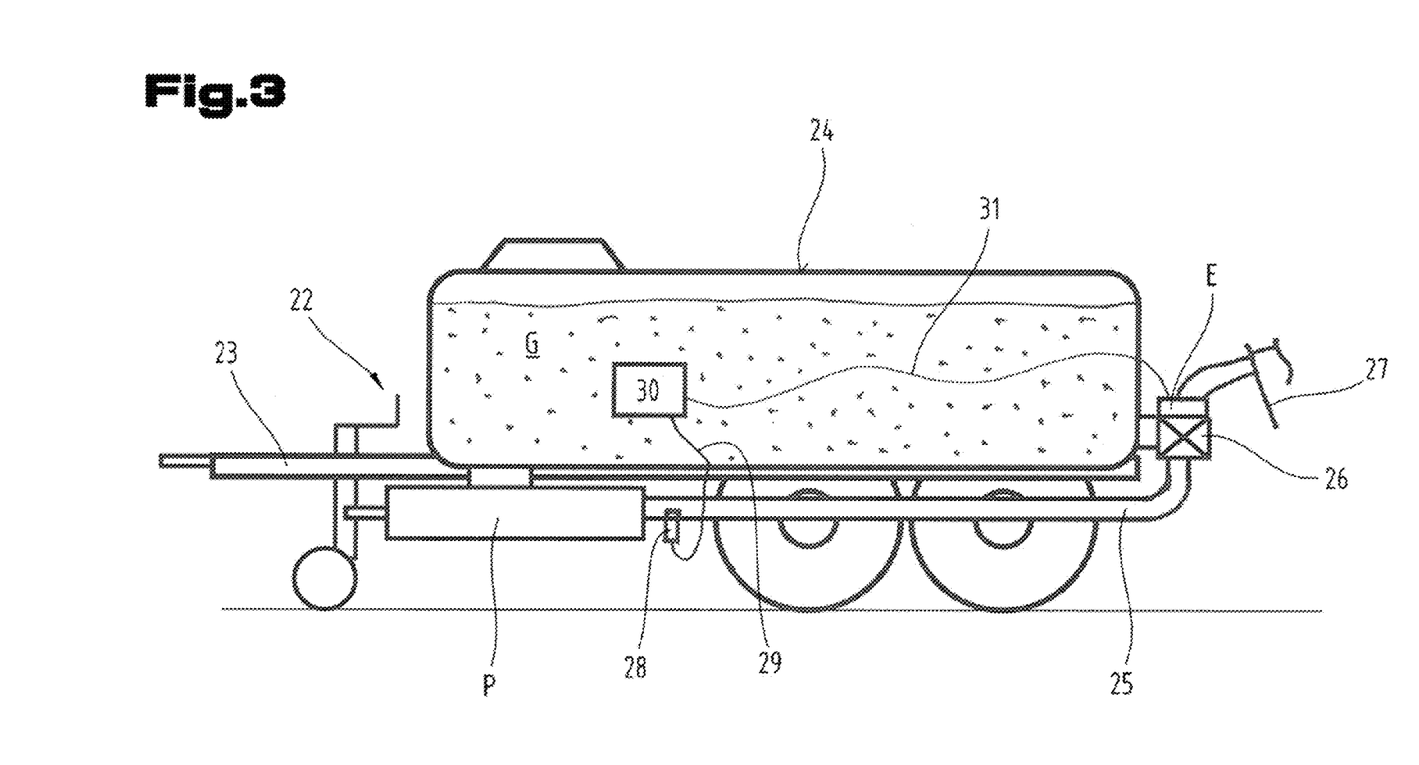
FIG. 3 illustrates a different embodiment of a manure-distributing vehicle designed as a trailer.

FIG. 3 is likewise a schematic diagram showing another embodiment of a slurry trailer 22. This design also has a chassis 23 and a supply container 24 as well as a pipe system 25 and a valve 26, by means of which the distributor device 27 is pressurized. A sensor 28 is connected via data cables 29 to an evaluation unit 30 which activates the valve 26 via other data cables 31 depending on the result of the analysis of the slurry sensor 28 so that the quantity of slurry—by reference to its contents—distributed on the ground by the distributor device 27 corresponds to the predefined contents per unit of surface area as accurately as possible.

Unlike the embodiments described above, a pump 32 is provided in this example of an embodiment. The sensor 28 is disposed in a section of the pipe system 25 located between the valve 26 and pump 32. When the valve 26 is set accordingly, the slurry G disposed in the supply container 24 is circulated through the pipe system 25 by the pump 32, and is also "stirred up" so to speak because all of the slurry circulates through the pipe system 25 and is completely recirculated to the supply container 24. During this stirring process, the slurry G is analyzed by the sensor 28, a mean value is determined by the evaluation unit 30 and this is then evaluated in readiness for activating the valves 26 for the distribution.

Figure 4:
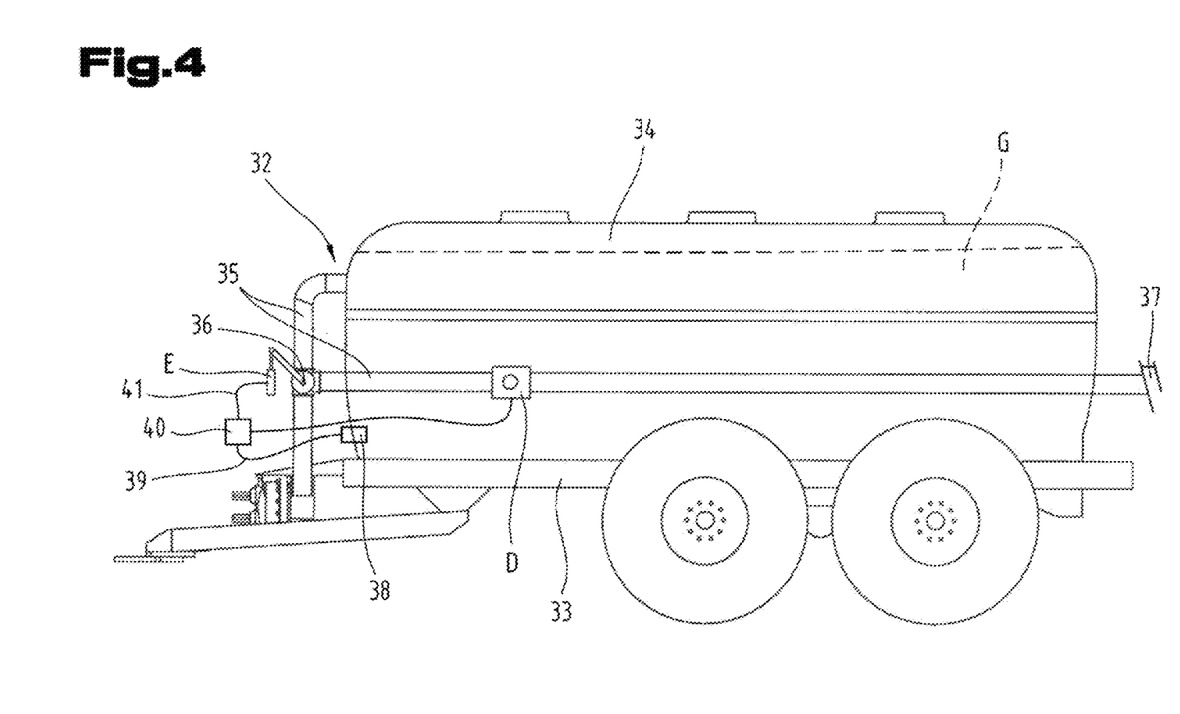
FIG. 4 illustrates a manure trailer with an adjustable three-way valve for regulating the through-flow quantity.

FIG. 4 illustrates another variant of a slurry trailer. This embodiment also has a chassis 33 and a supply container 34, as well as a pipe system 35 and a valve 36, which places the distributor device 37 under pressure. A sensor 38 is connected via data cables 39 to an evaluation unit 40, which activates the valve 36 via other data cables 41 by means of an adjustable device E as a function of the result of the analysis conducted by the slurry sensor 38 so that the quantity of slurry applied to the ground by the distributor device 37—by reference to its contents—conforms as accurately as possible to the prescribed contents per unit of surface area. To this end, the adjustable device E is provided in the form of a valve 36, preferably a three-way valve, which is activated on the basis of the results of the analysis conducted by the slurry sensor 38 so that the quantity of slurry G applied per unit of surface area—by reference to its contents—is regulated on the basis of the control data. A through-flow counter D disposed in the pipe system 35 measures the quantity of slurry G applied and adjusts the three-way valve 36 by means of an adjustable device E so that the quantity of slurry G—by reference to its contents—determined by the evaluation device 40 corresponds to the prescribed contents per unit of surface area as accurately as possible and is applied by the distributor device 37. The three-way valve 36 directs the quantity of surplus slurry back to the supply container 34 using a bypass system. Several, for example two, shut-off valves may also be used to fulfill the function of a three-way valve.

Figure 5:
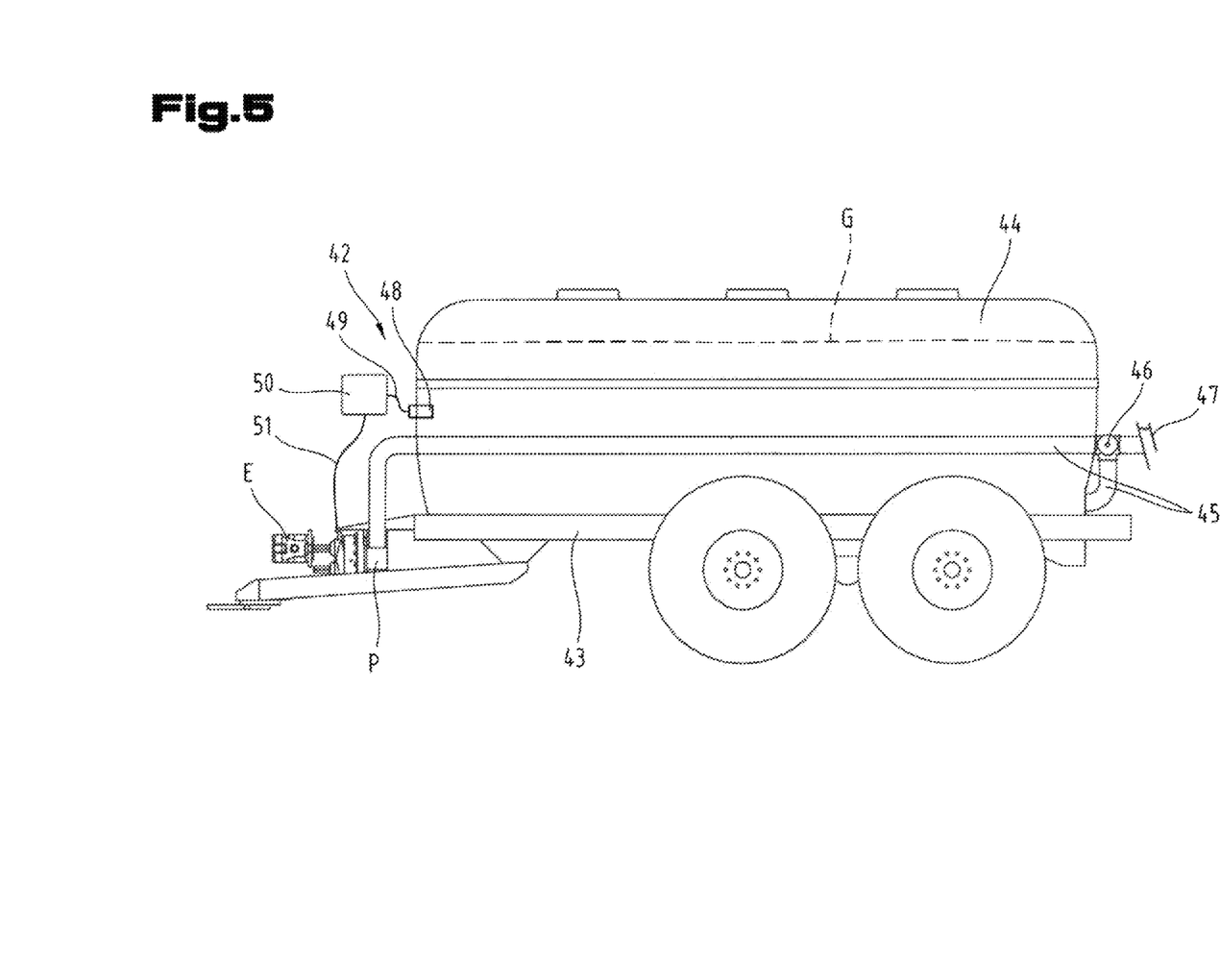
FIG. 5 illustrates a manure trailer with an adjustable pump for regulating the through-flow quantity.

FIG. 5 illustrates another variant of a manure-distributing vehicle 42. This embodiment also has a chassis 43 and a supply container 44, a well as a pipe system 45 and a valve 46, which places the distributor device 47 under pressure. A sensor 48 is connected via data cables 49 to an evaluation unit 50, which activates the system via other data cables 51 by means of an adjustable device E in the form of a pump P as a function of the result of the analysis conducted by the slurry sensor 48 so that the quantity of slurry applied to the ground by the distributor device 47—by reference to its contents—corresponds as accurately as possible to the prescribed contents per unit of surface area. To this end, the adjustable device E is provided in the form of a pump P, the speed of which is regulated and which is activated as a function of the result of the analysis conducted by the slurry sensor 48 so that the quantity of slurry (G) to be applied—by reference to its contents—is regulated accordingly on the basis of the control data. The delivery rate based on the speed of the regulated pump P is referred to as the injection rate in liters per revolution, so that the quantity of slurry G delivered can be defined exactly on the basis of the regulated speed.

Figure 6:
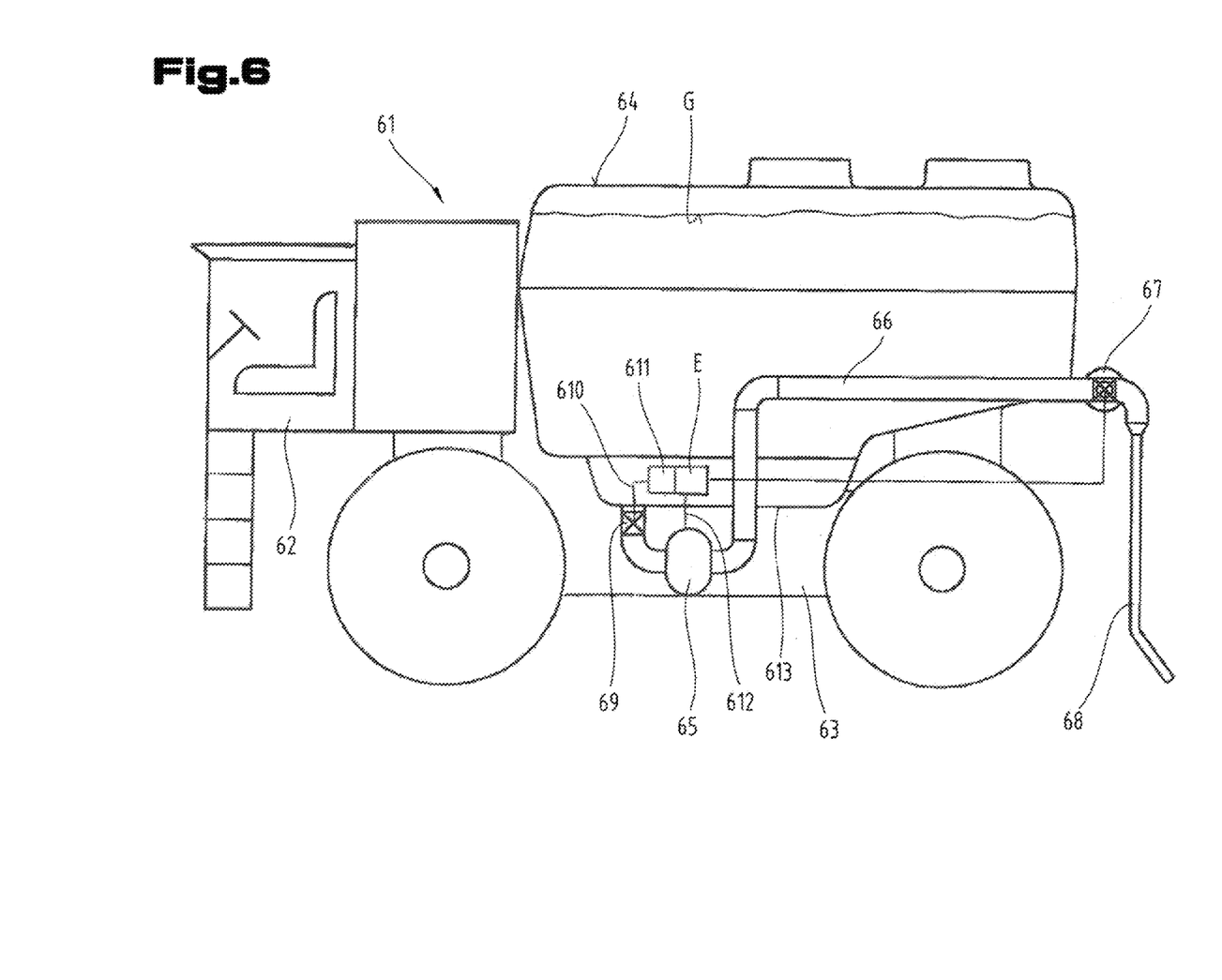
FIG. 6 illustrates a variant of a manure-distributing vehicle designed as a self-propelled vehicle and FIG. 7 illustrates a combination comprising a tractor and a slurry trailer proposed by the invention.

FIG. 6 is a highly schematic diagram showing a side view of a manure-distributing vehicle. Reference 61 denotes the manure-distributing vehicle as a whole, which comprises a driver's cab 62 and a chassis 63. A slurry tank 64 contains the supply of slurry G to be applied. A pump 65 delivers the slurry G to be applied with the aid of a pipe system 66 to a distributor device 67, by means of which the slurry G is distributed. The distributor device 67 may be of any type but it may be of advantage to use a trailing hose system—as illustrated here. The distributor device 67 illustrated, which is a trailing hose system in this instance, is provided with trailing hoses 68, which terminate close to the ground, thereby optimizing the distribution of slurry G.

A slurry sensor 69 is integrated at any point in the pipe system 66 and constantly analyzes the slurry flowing through the pipe system 66. The slurry sensor 69 may be of any design but must be suitable for analyzing the circulating slurry G as it is applied in order to determine its contents. One design proposed by the invention is that of a slurry sensor 69 which subjects the slurry G to a spectral analysis. The measurement data obtained from the slurry sensor 69 is forwarded via data cables 610 to an evaluation device 611, which activates the pump 65 and/or the distributor device 67 by means of an adjustable device E via other data cables 612 and 613 as a function of the result of the analysis conducted by the slurry sensor 69 so that the quantity of slurry applied to the ground by the distributor device 67—by reference to its contents—corresponds to the prescribed contents as accurately as possible. In this respect, this manure-distributing vehicle operates in the same way as those described above.

As may be seen, in the case of this embodiment illustrated as an example, the proportions of substances measured by the slurry sensor 69 as they are being applied determine the quantity of slurry applied. To this end, the measurement data is converted in the evaluation device 611 into control signals for the adjustable device E, which controls the pump 65 and/or distributor device 67 and hence the applied quantity depending on the required quantities. The required quantities might be quantities prescribed by the legislators or requirement data based on the nutrients required by the soil generally or nutrients required by the plants.

Figure 7:
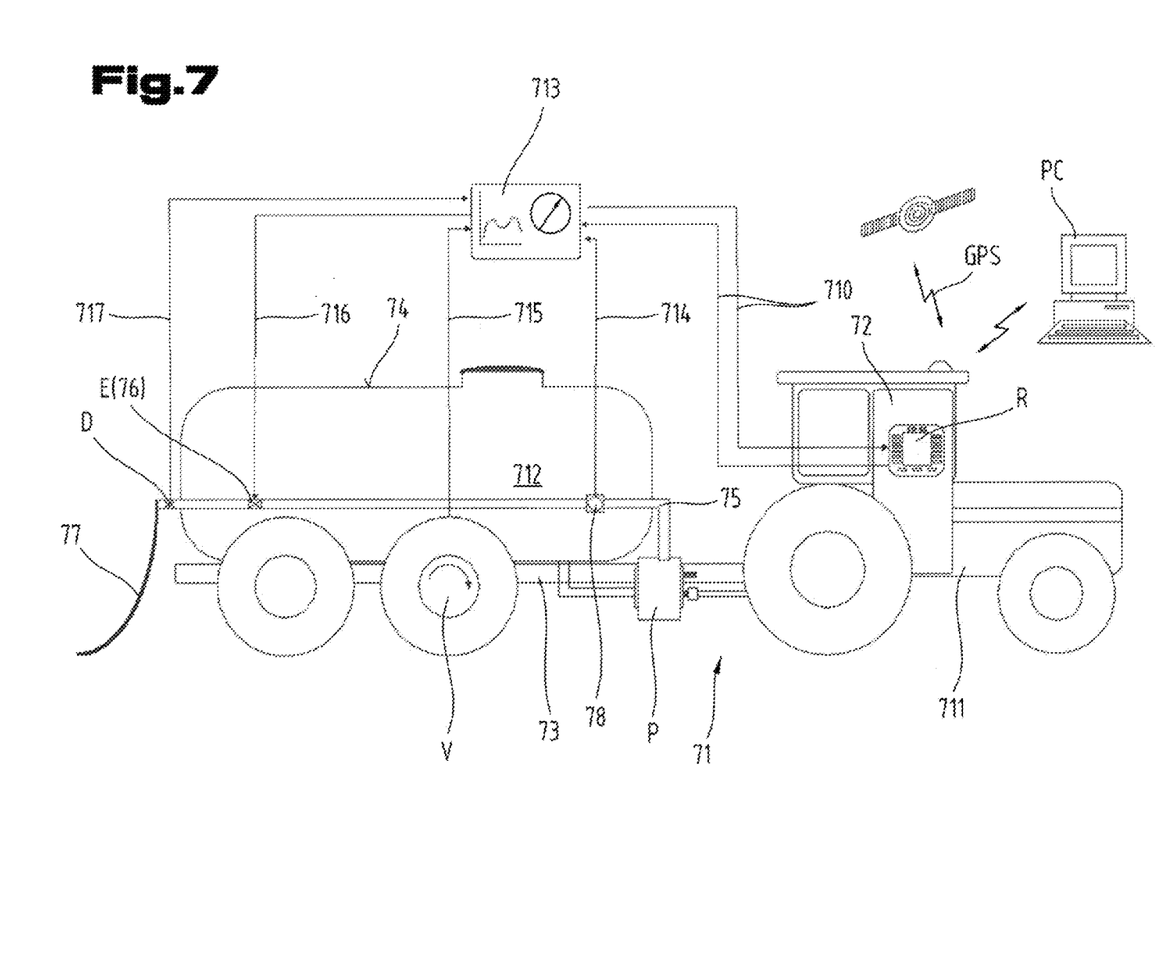

FIG. 7 illustrates a combination 71 comprising a tractor 711 and slurry trailer 712 proposed by the invention, which has at least one chassis 73 and a supply container 74. Disposed in a driver's cab 72 of the tractor 711 is a computer R, which is connected via data cables 710 to an evaluation device 713 by means of a so-called ISOBUS. Values of settings are generated in the evaluation device 713 for an adjustable device E which is integrated in the pipe system 75 of the slurry trailer 712. The adjustable device E may be a control valve 76, the control data of which can be forwarded by the evaluation device 713 to the control valve 76 via a data cable 716. A sensor 78 supplies the evaluation device 713 with data for analysis relating to the slurry contents via other data cables 714. The sensor 78 is likewise disposed in the pipe system 75 of the slurry trailer 712. A speed sensor V determines the speed of travel of the combination 71 and transmits it to the evaluation device 713 via other data cables 715. Also disposed in the pipe system 75 is a flow meter D, which is connected to the evaluation device 713 via another data cable 717. The measured flow quantity is therefore obtained and incorporated in the data processing system of the evaluation device 713 as another control variable. Disposed at the free end of the pipe system 75 is the distributor device 77, by means of which the computed correct quantity of slurry is distributed.

The combination 71 advantageously has a so-called Global Positioning System, a satellite-assisted system for determining the position worldwide (GPS). With the aid of this device, application of the slurry can be fully documented in relation to the specific site. The relevant data relating to the application process can therefore also be transmitted wirelessly to the computer PC in the user's office, from where an agricultural co-operative can be run.

It may be of particular advantage if the data cables described above in connection with the drawings are optical data cables, e.g. fiber optic cables.

The described manure-distributing vehicles enable the slurry to be analyzed close to the time of distribution. As a result, the distribution quantity can be regulated rapidly because the analysis results needed to regulate the distribution quantity are already available at the time of distribution and it is then only the working width and driving speed of the slurry vehicle which affect the distributed quantity.

The mechanical stress on the modules needed in order to conduct the analysis is relatively low because the measuring and analysis operations take place prior to distribution and not during driving. There is no stress caused by vibrations and shaking with these embodiments. Furthermore, any blockages in the distributor will not lead to pressure problems at the sensor, for example due to pulsation, which might otherwise affect the measurements.

Furthermore, allowance can be made relatively easily for the effect of temperature by conducting an analysis close to the requisite time.

Determining average values for the entire supply container during or after filling and/or after stirring is easy but is still totally adequate for optimizing distribution.

However, it may be of advantage to conduct an analysis as the slurry is being applied, as described in more detail in connection with the embodiment illustrated as an example in FIG. 6.

In any event, the analysis is guaranteed to be performed close to the time of distribution, thereby avoiding delays which would occur if the analysis were conducted in a laboratory.

The advantage of conducting an analysis as proposed by the invention during the process of filling a slurry vehicle rather than conducting an analysis of the entire slurry in a stationary slurry silo is that a large number of sub-analyses is available in each case for a tank-load of a manure-distributing vehicle. Changes in the contents due to floating or sinking layers in the slurry silo are detected in the individual tank batches and taken into account.

In addition to determining and making allowance for the content of nitrogen in the slurry, other substances such as phosphorous, potassium—to mentioned but a couple—can be determined and evaluated by the analysis. The evaluation may be made for the purpose of documenting what substances the slurry contained but it would also be possible to apply the slurry on the basis of other substances contained in it.

LIST OF REFERENCE NUMBERS

1 Slurry vehicle designed as a self-propelled vehicle
2 Driver's cab
3 Chassis
4 Supply container
5 Pipe system
6 Valve
7 Distributor device
8 Sensor
9 Data cable
10 Evaluation unit
11 Data cable
12 Slurry vehicle designed as a trailer
13 Chassis
14 Supply container
15 Pipe system
16 Valve
17 Distributor device
18 Sensor
19 Data cable
20 Evaluation unit
21 Data cable
22 Slurry vehicle designed as a trailer
23 Chassis
24 Supply container
25 Pipe system
26 Valve
27 Distributor device
28 Sensor
29 Data cable
30 Evaluation unit
31 Data cable
32 Manure-distributing vehicle designed as a trailer
33 Chassis
34 Supply container
35 Pipe system
36 Valve
37 Distributor device
38 Sensor
39 Data cable
40 Evaluation device
41 Data cable
42 Manure-distributing vehicle designed as a trailer
43 Chassis
44 Supply container
45 Pipe system
46 Valve
47 Distributor device
48 Sensor
49 Data cable
50 Evaluation device
51 Data cable
61 Slurry vehicle designed as a self-propelled vehicle
62 Driver's cab
63 Chassis 64 Slurry tank
65 Pump
66 Pipe system
67 Distributor device
68 Trailing hoses
69 Sensor
610 Data cable
611 Evaluation device
612 Data cable
613 Data cable
71 Combination
710 Data cable
711 Tractor
712 Slurry trailer
713 Evaluation device
714 Data cable
715 Data cable
716 Data cable
717 Data cable
72 Driver's cab
73 Chassis
74 Supply container
75 Pipe system
76 Control valve
77 Distributor device
78 Sensor
B Filling region
D Flow meter
E Adjustable device
G Slurry
GPS Global Positioning System
P Pump
PC Office computer
R Computer
V Speed sensor

The invention claimed is:

1. A method of optimizing the quantity of slurry of manure to be distributed on ground to be fertilized with the aid of a manure-distributing vehicle having a supply container for storing the slurry of manure, comprising the following steps:
analyzing the slurry of manure to be distributed by at least one sensor in the manure-distributing vehicle by determining average values of the contents of the entire slurry in the supply container of the manure-distributing vehicle at a point in time during filling of the supply container of the manure-distributing vehicle and at a point in time close before the distribution process of distributing the slurry of manure from the same supply container of the manure-distributing vehicle is started by activating a distributor device;
comparing actual data of the contents of the slurry within the supply container obtained from the analysis with predefined contents data in an evaluation device;
determining control data by the evaluation device as a function of the comparison of the actual data;
forwarding the control data to an adjustable device by means of which a quantity of slurry of manure can be varied; and
activating the distributor device by the adjustable device on the basis of the control data so that the quantity of slurry of manure to be distributed per unit of surface area from the supply container of the manure-distributing vehicle is regulated in accordance with the control data.

2. The method according to claim 1, wherein the sensor comprises an optical sensor, said sensor subjecting the slurry to a spectral analysis.

3. The method according to claim 1, further including measuring a speed of travel of the manure-distributing vehicle by a speed sensor and transmitting speed data to the evaluation device.

4. The method according to claim 1, wherein analyzing the slurry of manure during filling uses a first sensor and close before the distribution process uses a second sensor.

5. A manure-distributing vehicle having a supply container for storing a slurry of manure, and at least one distributor device which is connected to the supply container by means of a pipe system, and at least one sensor associated with the supply container for measuring the contents of the slurry of manure to be distributed from the manure-distributing vehicle, wherein the at least one sensor is operative for analyzing the slurry at a point in time during filling of the supply container of the manure-distributing vehicle and at a point in time close before a distribution process of distributing the slurry of manure from the same supply container of the manure-distributing vehicle is started by activating the distributor device, and an evaluation device operative for generating control data which is computed by comparing actual data of the contents of the slurry measured by the at least one sensor with pre-definable contents data, wherein the at least one sensor is disposed in the supply container of the manure-distributing vehicle and the distributor device is activated by the adjustable device on the basis of the control data so that a quantity of slurry distributed per unit of surface area from the supply container of the manure-distributing vehicle is regulated in accordance with the control data.

6. The manure-distributing vehicle according to claim 5, wherein the adjustable device is provided in the form of a pump disposed in the pipe system, the speed of which can be regulated.

7. The manure-distributing vehicle according to claim 5, wherein the adjustable device is provided in the form of a three-way valve disposed in the pipe system.

8. The manure-distributing vehicle according to claim 5, wherein the distributor device is provided in the form of a trailing hose distributor, grubber or injector.

9. The manure-distributing vehicle according to claim 5, wherein it is provided in the form of a self-propelled vehicle.

10. The manure-distributing vehicle according to claim 5, wherein it is provided in the form of a trailer.

11. The manure-distributing vehicle according to claim 5, wherein the sensor is provided in the form of a sensor which operates on the basis of spectral analysis.

12. The manure-distributing vehicle according to claim 5, wherein the sensor is connected to the evaluation device by means of an optical data cable.

13. The manure-distributing vehicle according to claim 5, wherein the sensor is disposed in a filling region of the supply container.

14. The manure-distributing vehicle according to claim 5, wherein the at least one sensor comprises an optical sensor, said sensor operative for subjecting the slurry to a spectral analysis.

15. The manure-distributing vehicle according to claim 5, wherein the at least one sensor comprises a first sensor for measuring the slurry of manure during filling and a second sensor for measuring the slurry of manure close before the distribution process.

16. The manure-distributing vehicle according to claim 5, further including a speed sensor for measuring a speed of travel of the manure-distributing vehicle and transmitting speed data to the evaluation device.

17. A method of optimizing the quantity of slurry of manure to be distributed on ground to be fertilized with the aid of a manure-distributing vehicle having a supply container for storing the slurry of manure, comprising the following steps:

analyzing the slurry of manure to be distributed by at least one sensor in the manure distributing vehicle by determining average values of the contents of the entire slurry in the supply container of the manure distributing vehicle at a point in time during filling of the supply container of the manure distributing vehicle or at a point in time close before the distribution process of distributing the slurry of manure from the same supply container of the manure distributing vehicle is started by activating a distributor device for distributing the slurry of manure;

comparing actual data of the contents of the slurry within the supply container obtained from the analysis with predefined contents data stored in an evaluation device;

determining the speed of travel of the manure-distributing vehicle by a speed sensor;

transmitting the speed of travel to the evaluation device;

determining control data by the evaluation device as a function of the comparison of the actual data;

forwarding the control data to an adjustable device by means of which a quantity of slurry of manure can be varied; and     activating the distributor device by the adjustable device on the basis of the control data so that the quantity of slurry of manure to be distributed per unit of surface area from the supply container of the manure distributing vehicle is regulated in accordance with the control data.

18. A manure-distributing vehicle having a supply container for storing a slurry of manure, and at least one distributor device for distributing the slurry of manure which is connected to the supply container by means of a pipe system, and at least one sensor in the manure-distributing vehicle associated with the supply container for measuring the contents of the slurry of manure to be distributed from the supply container of the manure-distributing vehicle, wherein the at least one sensor is operative for analyzing the slurry at a point in time during filling of the supply container of the manure-distributing vehicle or at a point in time close before a distribution process of distributing the slurry of manure from the same supply container of the manure-distributing vehicle is started by activating the distributor device, a speed sensor for determining the speed of the manure distributing vehicle to be transmitted to an evaluation device, wherein the evaluation device is operative for generating control data which is computed by comparing actual data of the contents of the slurry measured by the at least one sensor with pre-definable contents data, wherein the at least one sensor is disposed in the supply container of the manure-distributing vehicle and the distributor device is activated by the adjustable device on the basis of the control data so that a quantity of slurry distributed per unit of surface area from the supply container of the manure-distributing vehicle is regulated in accordance with the control data.

\* \* \* \* \*